(12) United States Patent
Schumacher

(10) Patent No.: US 8,818,639 B2
(45) Date of Patent: Aug. 26, 2014

(54) CONTROL UNIT AND METHOD FOR ACTIVATING PASSENGER PROTECTION MEANS AND SENSOR FOR OUTPUTTING A CRASH-RELEVANT SIGNAL

(75) Inventor: Hartmut Schumacher, Freiberg (DE)

(73) Assignee: Robert Bosch GmbH, Stuttgart (DE)

( * ) Notice: Subject to any disclaimer, the term of this patent is extended or adjusted under 35 U.S.C. 154(b) by 620 days.

(21) Appl. No.: 12/735,111

(22) PCT Filed: Nov. 19, 2008

(86) PCT No.: PCT/EP2008/065780
§ 371 (c)(1),
(2), (4) Date: Oct. 14, 2010

(87) PCT Pub. No.: WO2009/083334
PCT Pub. Date: Jul. 9, 2009

(65) Prior Publication Data
US 2011/0035115 A1 Feb. 10, 2011

(30) Foreign Application Priority Data

Jan. 3, 2008 (DE) .................. 10 2008 003 082

(51) Int. Cl.
*B60R 22/00* (2006.01)
(52) U.S. Cl.
USPC ............................................. 701/45
(58) Field of Classification Search
USPC ............................................. 701/45
See application file for complete search history.

(56) References Cited

U.S. PATENT DOCUMENTS

| | | | |
|---|---|---|---|
| 4,929,941 A | | 5/1990 | Lecocq |
| 5,430,334 A | * | 7/1995 | Meister ..................... 307/10.1 |
| 5,620,202 A | | 4/1997 | Gray et al. |
| 5,748,675 A | | 5/1998 | Hormel et al. |
| 6,220,627 B1 | * | 4/2001 | Stanley ..................... 280/735 |
| 6,644,688 B1 | * | 11/2003 | Hu et al. ................... 280/735 |
| 8,494,446 B2 | * | 7/2013 | Raggam et al. ............ 455/41.1 |
| 2002/0036430 A1 | | 3/2002 | Welches et al. |
| 2004/0016577 A1 | * | 1/2004 | Lichtinger et al. .......... 177/144 |
| 2005/0109935 A1 | | 5/2005 | Manlove et al. |
| 2008/0042410 A1 | * | 2/2008 | Breed et al. ................ 280/735 |
| 2010/0299449 A1 | * | 11/2010 | Terlizzi ...................... 709/237 |

FOREIGN PATENT DOCUMENTS

| | | |
|---|---|---|
| DE | 198 33 242 | 2/1999 |
| DE | 102 50 920 | 5/2004 |
| DE | 103 60 666 | 7/2005 |
| DE | 10 2005 012 119 | 6/2006 |
| EP | 0 318 354 | 5/1989 |
| RU | 2271945 | 3/2006 |
| RU | 2279117 | 6/2006 |
| WO | WO 2004/098939 | 11/2004 |

* cited by examiner

*Primary Examiner* — Hussein A. Elchanti
(74) *Attorney, Agent, or Firm* — Kenyon & Kenyon LLP

(57) ABSTRACT

A control unit and a method for activating passenger protection arrangement, as well as a sensor for outputting a crash-relevant signal, are proposed. A digital signal, which is relevant for activating the passenger protection arrangement, is output with the aid of an interface. The interface has a plurality of power sources for influencing the signal edges of the digital signal.

18 Claims, 3 Drawing Sheets

CONTROL UNIT AND METHOD FOR ACTIVATING PASSENGER PROTECTION MEANS AND SENSOR FOR OUTPUTTING A CRASH-RELEVANT SIGNAL

BACKGROUND OF THE INVENTION

1. Field of the Invention

The present invention relates to a control unit, a method for activating passenger protection means, and a sensor for outputting a crash-relevant signal.

2. Description of Related Art

It is already known from published German patent document DE 102 50 920 A1 that in data transmissions in passenger protection systems such narrow pulses occur during pulse width modulation that problems with regard to electromagnetic compatibility may result.

BRIEF SUMMARY OF THE INVENTION

The control unit, the method, and the sensor according to the present invention have the advantage over the related art in that an effective contribution to electromagnetic compatibility (EMC) is achieved by influencing the signal edges of the digital signal to be transmitted with the aid of multiple power sources which are situated in an interface. Influencing the signal edges makes it possible to configure these signal edges in the sense of an optimum EMC. According to the present invention, it is possible in particular to meet appropriate EMC standards more easily and cost-effectively. Primarily according to the present invention, the potential of modern ASICs, which provide a system module in the airbag control unit, may be fully utilized with respect to digital options. A so-called EMC slope shaping by suitable slope control is thus possible. A lower tolerance is given, standards may be complied with, and the design is more cost-effective and more flexible overall.

The present invention may thus be used in particular in such system ASICs and makes additional external components unnecessary. Such system ASICs are to be understood as modules which include more functions than only a pure data transmission function as a transceiver, i.e., they have the transceiver as one of multiple circuit blocks, for example, system ASICs in passenger protection systems have LIN transceivers as the circuit blocks for connecting peripheral sensors or sensor control units via point-to-point connections or bus systems.

The present invention may also be used in system ASICs of external sensors of passenger protection systems which include the circuit block "power interface" for connecting to point-to-point connections, quasi buses, or buses.

The present invention allows for qualitatively better slope shaping. Slope shaping may be better adapted to the predefined interfaces and/or bus loads. The manufacturing and temperature tolerances of slope shaping are clearly better than in analog circuits, for example.

Such slope shaping according to the present invention makes it possible to achieve higher data rates without additional shielding measures such as are implemented by suppressing unnecessarily high frequency components in the transmission edges while improving the symmetry of rising and falling signal edges.

The power sources influence the signal edges in a predefined time range, depending on what rising or fall times are aimed at. The power sources exert influence on the two logic levels at the most as a zero-frequency component.

A control unit is understood here to be an electrical device which processes sensor signals and outputs triggering signals for passenger protection means as a function thereof. Passenger protection means are airbags, seat belt tighteners, crash-active head rests, but also pedestrian protection means as well as active passenger protection means such as brakes and/or an electronic stability program. In this context, triggering means the activation of such passenger protection means.

The at least one interface is preferably part of a system ASIC, i.e., of an integrated circuit. However, it is possible to construct the at least one interface as a stand-alone integrated circuit or with the aid of additional discrete components. It may also be implemented in the software.

The digital data signal may represent one or multiple individual signals. The digital modulation is preferably an amplitude modulation, but other modulation techniques such as a pulse width modulation, etc., are also possible here.

The power sources may be produced using all kinds of circuitry measures. At least part of such a power source may also be implemented in the software. The power sources may be designed in particular as classic current sinks. In particular, a reference current, which may also be multiplied via a power bank, may be used for the power sources.

The signal edges are the sudden changes of the signal in order to alternate between the values which represent logic 0 and logic 1.

The sensor according to the present invention is such a sensor which outputs crash-relevant signals; these are, for example, impact signals but also surroundings signals, or also signals regarding the vehicle's occupants, or other signals which could be useful in activating passenger protection means.

It is advantageous that for the plurality of power sources an activation unit is provided which digitally switches the power sources at the predefined points in time to influence the signal edges, a first clock rate for switching being greater than the data clock rate. According to this example embodiment, the power sources are normally switched directly using a decoder word as a function of a triggering signal in order to obtain an appropriate total current. This total current is superimposed on the digital signal, the power sources being switched using such a clock rate which is much greater than the data clock rate, so that the edge of the data signal may be precisely modified and configured in a small time window.

The activation unit here is a decoder, for example, or another circuit component which is able to process signals as a function of outputting other control signals.

Moreover, it is advantageous that the interface has a recognition circuit for recognizing the output of the digital signal and furthermore a counter which starts as a function of a recognition signal of the recognition circuit and a decoder which switches the power sources as a function of the counter content. The interface thus recognizes with the aid of the recognition circuit whether the transmission of data is planned. If this is the case, a counter is started whose counter content activates a decoder which controls switching of the power sources as a function of the counter content, for example, by using appropriate decoder words which determine which power source is to be switched or not at the given point in time. The recognition circuit is a circuit component, for example, which is configured to recognize edges. The counter is a 6-bit counter, for example, which is started as a function of the recognition signal and the decoder converts the counter content into code words so that the power sources are switched as a function of these decoder words. It is possible that the decoder words are hard-wired or are determined via a further interface of the microcontroller of the control unit, for example. Other influences are also possible here which reflect the instantaneous bus load in particular. However, since the bus load is normally known a priori, such hard-wiring may be provided. It may furthermore be provided that a signal is applied which is selected from different hard-wired combinations of decoder words, the signal then optimally corresponding to the corresponding bus load.

Moreover, it is advantageous that the interface has exactly four power sources because it has been found that four power sources are sufficient to carry out appropriate control of the edges. More power sources make a more accurate configuration of the edges possible and fewer power sources provide for a more inaccurate configuration.

It has been proven advantageous that the clock rate with which the power sources are switched is 100 times greater than the data clock rate. The edges may therefore be very accurately configured since many points in the edge are individually determined due to this high clock rate in switching the power sources.

It is furthermore advantageous that an influencing circuit is provided for influencing particular current values of the particular power sources. This influencing circuit may be part of a system ASIC, but it may alternatively be implemented as software, at least partially. An external implementation outside the System ASIC is also possible. The current values may be influenced individually for the individual power sources or for a central value whose modification results in a modification of all power sources with respect to their values.

In addition, it is advantageous that the interface, as already mentioned above, is situated on an integrated circuit having additional control unit functions, whereby a so-called system ASIC is implemented. The additional control unit functions are, for example, the ignition circuit including the electrically controllable power switches, a safety controller which, together with the microcontroller, checks the sensor values as to whether or not a deployment case exists, and the power supply or the power management for the control unit. It is possible that a plurality of such integrated circuits is situated in a control unit.

DETAILED DESCRIPTION OF THE INVENTION

Figure 1:
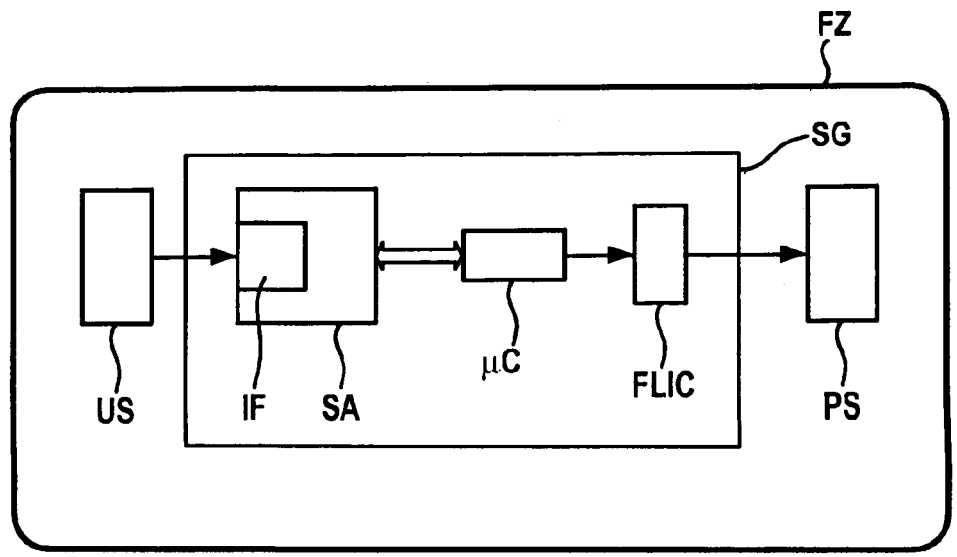
FIG. 1 shows a control unit according to the present invention having connected components.

FIG. 1 shows a control unit SG of the type according to the present invention having connected components in vehicle FZ. For the sake of simplicity, only the components necessary for understanding the present invention are illustrated here. Other components, which are necessary for operating the control unit but are not contributing to understanding the present invention, have been omitted for the sake of simplicity.

A crash sensor system US is connected to control unit SG and also to a system ASIC SA. This system ASIC SA has an interface area IF, referred to as interface in the following, to which the crash sensor system may be linked. This sensor system not only includes impact sensors such as acceleration sensors, and air pressure sensors, and structure-borne noise sensors, but also surroundings sensors such as radar, ultrasound and/or lidar sensors, as well as occupant sensors which represent the presence and possibly the weight and posture of the occupants. It is possible that still additional sensors may be provided which may subsumed under the term crash sensors US. In simplified form, such crash sensors are situated here outside control unit SG. But it is also possible that such crash sensors may be situated in control unit SG at least partially. System ASIC SA as an integrated circuit has, as mentioned above, additional functions which, however, play a secondary role and are initially passed over here. System module SA is connected to microcontroller µC in order to communicate the signals of crash sensors US to microcontroller µC. Microcontroller µC processes the sensor signals in such a way that a deployment decision for passenger protection means PS is made. The command for activation due to this deployment decision is transmitted to trigger circuit FLIC. This trigger circuit FLIC may be part of the system ASIC. Trigger circuit FLIC has electrically controllable power switches which enable the current feed to ignition elements of an airbag or other actuators and thus contribute to their activation. The transmission of data, e.g., from or to crash sensors US, may be associated with electromagnetic radiation, in particular in the case of steep edge transitions. According to the present invention, these transitions are designed in such a way that the radiation is minimized. For configuring these transitions, power sources in interface IF are used which, compared to the data clock rate, have a very high clock rate, thereby enabling an accurate configuration of these edges, the falling edge as well as the rising edge.

Figure 2:
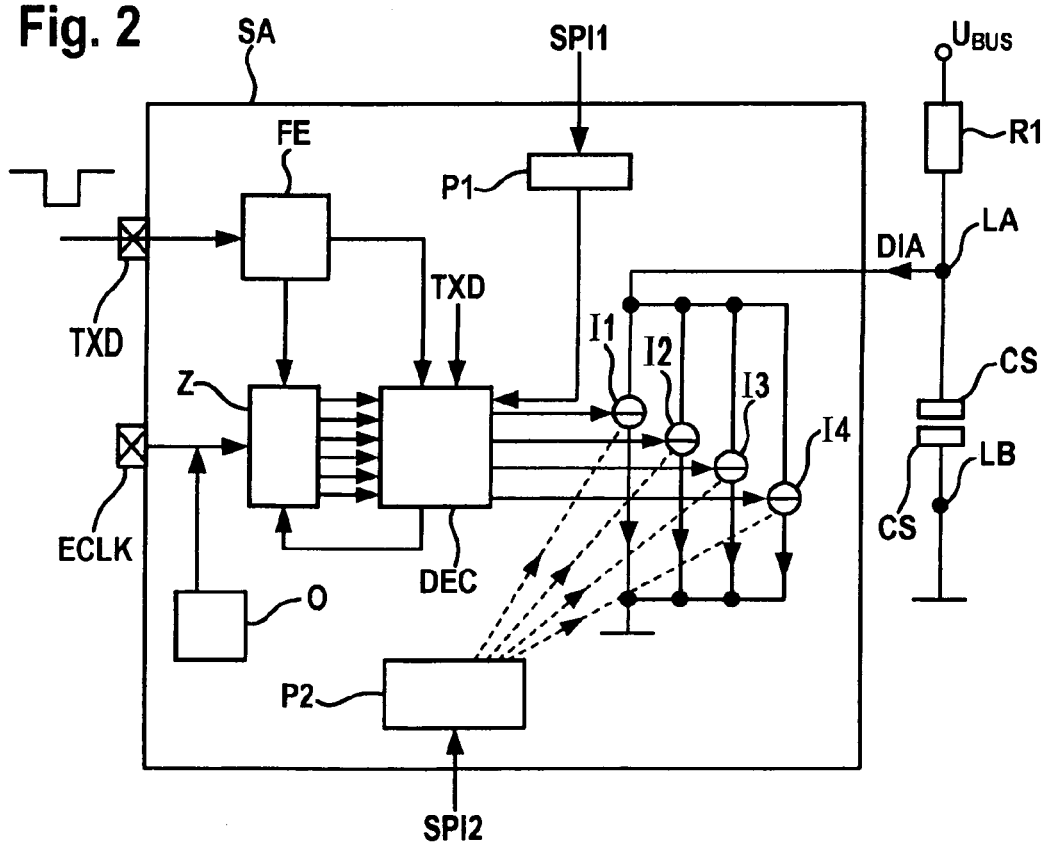
FIG. 2 shows a block diagram of the interface according to the present invention.

FIG. 2 shows an example of the interface according to the present invention, only this relevant part being shown on system ASIC SA. An edge recognition circuit FE is provided on the system ASIC, which recognizes that, for example, the ASIC-external microcontroller or alternatively an ASIC circuit block, comparable to a microcontroller, wants to transmit data to other components, i.e. TXD data. These data are transmitted as a digital signal. If edge recognition circuit FE detects a falling edge in the TXD signal, then it activates a counter Z, here a 6-bit counter. This counter is clocked at clock rate ECLK, here 2 MHz, which corresponds to one hundred times the present data clock rate. The clock rate may be optionally generated or at least partially generated using an ASIC-internal oscillator O.

Edge recognition circuit FE transmits to a decoder DEC whether a falling or rising edge has been detected. In addition, counter Z transmits its counter content. Moreover, data signal TXD to be transmitted is conveyed to decoder DEC. Depending on the counter content reached, decoder DEC generates new predefined decoder words; for example, for 64 counter values of a 6-bit (Nbit) counter, the 4-bit (<=Nbit) decoder word DW1 may be output for counter content 0-1, for counter content 2-4 the 4-bit decoder word, etc. These decoder words are output to 4 (<=N) power sources I1, I2, I3, and I4, which means decoder DEC outputs current vectors which determine which of power sources I1, I2, I3, or I4 will be switched and which will not.

FIG. 2 shows a transceiver interface which carries out the slope shaping according to the present invention. Signal TXD to be transmitted is generated by a microcontroller µC or alternatively by other circuit blocks of system ASIC SA. The function of the circuit part shown in FIG. 2 is to process the digitally present information in the form of a serial sequence of data bits in such a way that it may be transmitted on a line of a distance encoder sensor without great interfering radiation. For example, a distance encoder sensor is understood to be a peripheral sensor, i.e., a sensor situated outside the control unit.

According to the present invention, the digital signal is amplified by a driver stage using power sources I1 through I4 in such a way that the data stream, despite a present bus load, may be accurately transmitted to receivers several meters away. For this purpose, only signal TXD and a driver power source activatable therewith, e.g. a current sink, would be necessary. For a LIN interface this would be 50 mA, for example. However, at a capacitive load of the bus necessary for filtering HF radiation, this results in a quickly falling voltage edge determined by the current sink (50 mA) and the total bus capacitance, and a voltage edge rising more slowly which is exclusively determined by pull-up resistors and the total capacitance of the bus. Depending on the level of the bus voltage, this results in a heavy imbalance of falling and rising signal edges on the bus. A general optimization of the falling and rising signal edges on the bus may be achieved in this example in that the period of the falling and rising edge changes, controlled by TXD, experiences a sufficient temporal resolution with the aid of an auxiliary clock rate in the form of the system clock rate or multiples thereof or by an ASIC-internal oscillator.

For example, for a LIN interface having a bit period of 50 μs this may be achieved using a 2 MHz clock rate, for sensor buses having bit periods of, for example, 8 μs per bit using 12.5 MHz, for example. This estimation is based on the assumption of obtaining good edge-forming results if the resolution for the form modification takes place using a signal that is 100 times faster.

Input signal TXD is recognized by edge recognition circuit FE; if it is falling, the N-bit counter, here the 6-bit counter Z, is started, which is clocked at a suitable, previously described frequency. The primary N-output points, here 6 of counter Z, are conveyed to decoder DEC. According to predefined counter states, the decoder establishes new settings via activating signals to the power sources. The power sources are, as mentioned, current sinks or, if needed, also so-called high-side sources which are present in system ASIC SA due to electrically controllable transistors, preferably MOS-FETs or n or p channel types. In the case of a falling edge, from counter content 0 to a counter content 38, for example, with a time interval of 0.5 μs, the current may increase stepwise, i.e., every 0.5 μs to 19 μs, from 3.5 mA to 52.5 mA. Using four power sources, where the first power source I1 has 3.5 mA, the second power source I2 has 7 mA, the third power source I3 has 14 mA, and the fourth power source I4 has 28 mA, the edge, here the falling edge, may be formed. Using this diagnostic current IDIA, changeable in the time range of the edge, the edge (voltage) is formed. Until a new decoder word is reached, the previous output vector for activating the power sources is maintained. In order to prevent a delay between transmit data TXD occurring in the ASIC at clock rate ECLK, the first output vector may optionally be directly output to the power sources for counter content 0 after a falling edge at TXD=0. In an N-bit counter, a maximum of $M \leq 2^n$ decoder words may be used for the falling edge of the voltage. In the above-mentioned example, 14 decoder words are used in a 6-bit counter and with a resolution of 0.5 μs so that 14 diagnostic current changes are carried out for obtaining a certain falling voltage edge. By suitably selecting the decoder words, equidistant current changes may be mixed at will with non-equidistant current changes. The number of power sources is typically $\geq 1$.

If the counter hits the stop decoder word after a prior falling TXD edge, decoder DEC prompts counter Z to stop. Corresponding to this decoder word, a holding current vector, e.g., 52.5 mA, is output to power sources I1 through I4, as mentioned above. This holding current vector is maintained until a rising edge occurs in data bit TXD.

If edge recognition circuit FE detects a rising edge, then counter Z is reset and a counter start is triggered, so that a new current vector is output to the power sources by decoder DEC. By specifying suitable predefined current vectors, the further progression of the rising voltage edge at output DIA is influenced similarly to the falling edge (the predefinition of the current vectors for forming the rising edge is generally different from that for forming the falling edge). The definition of the suitable current vectors and their positioning in time takes place on the basis of the physical bus loads, e.g., the bus pull-up resistor or pull-up resistors or the entire bus capacitance. If counter Z reaches the stop decoder word for the rising edge, a (holding) current vector is normally output which results in a diagnostic current 0. The decoder words for predefining a new current vector may be hard-wired, fixedly selectable by an ASIC interconnection mask or by so-called Zener zapping, or flexibly programmed by microcontroller μC using an appropriate number of writable registers via an SPI interface of the ASIC. This is symbolized here by programming block 1 and SPI interface SP1 which comes from microcontroller μC. For example, lines LA and LB of the bus are connected to terminal DIA, the data signal being output via contacts CS. Pull-up resistor R1 is used for voltage-based buses. Additionally or instead, forming of the edges may take place by setting power sources I1 through I4 using programming module P2; this setting may also take place fixedly or programmed via SPI interface SPI2. As indicated above, this may also take place by influencing a central factor.

Figure 3:
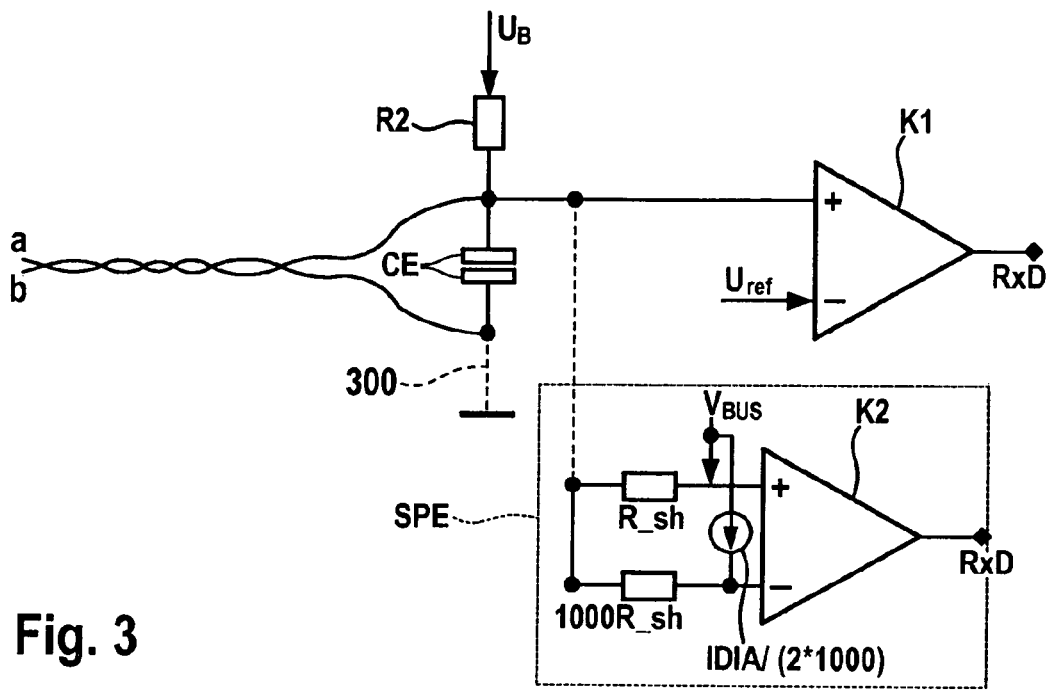
FIG. 3 shows a receiver circuit.

FIG. 3 shows a receiver for the signal which has been conducted via line Ltg a and line Ltg b. When a LIN bus is used, only one line, e.g., line Ltg a, is used. A prerequisite for this is that all bus users are connected to the vehicle chassis. This is indicated with reference numeral 300.

Illustrated are receive contacts CE and a pull-up resistor R2 which is connected to bus voltage UB which, however, may be omitted when current level receivers are used. The received voltage is typically compared with a reference voltage UREF in order to detect the signals transmitted via lines LA, LB. It is alternatively possible to provide a current level receiver SPE which detects the current change=data information in the bus line. For this purpose, the BUS current, fed by bus supply UB, is conducted via a shunt R_sh. At the same time, the bus supply voltage is applied to an input, e.g., the (+) side of a comparator Ukomp(+)=UB. The voltage at the other end of the shunt is UDIA=UB−IDIA*R_sh with respect to circuit GND. The second input of the comparator, e.g. the (−) side, is kept on Ukomp(−)=UB+1000R_sh*(1/1000)*IDIA/2=UDIA*(IDIA/2)*R_sh via resistor 1000*R_sh using the high side (pull-up power source) with I=(1/1000)*IDIA/2.

If no information bit is transmitted on the BUS, i.e., current amplitude IDIA=0, then UDIA=UB=UKomp(+).

UKomp(−)=UB+(IDIA/2)*R_sh.→RxD is on "0", since UKomp(−)>UKomp(+). If an information bit is exchanged with current amplitude IDIA then UDIA=UB−IDIA*R_sh, UKomp(+)=UB, UKomp(−)=UB−IDIA/2*R_sh, the comparator thereby tilts to "1", since UKomp(−)<UKomp(+). The stability of the receiver thus depends on the connection with a fixed threshold, which is formed from half of the current amplitude of the information bit to be expected. A slight BUS load according to GND is necessary for receiving the threshold current (1/1000)*IDIA/2. Other current levels may also be used for setting the threshold, but shunts and BUS load must be adjusted thereto.

Comparator K1 has a supply input to which 3.3V, i.e., the digital voltage, is applied. The same is true for comparator K2. Ground 300 may be dispensed with if the comparators operate with respect to line Ltg. b, e.g., when downstream optocouplers are used.

Figure 4:
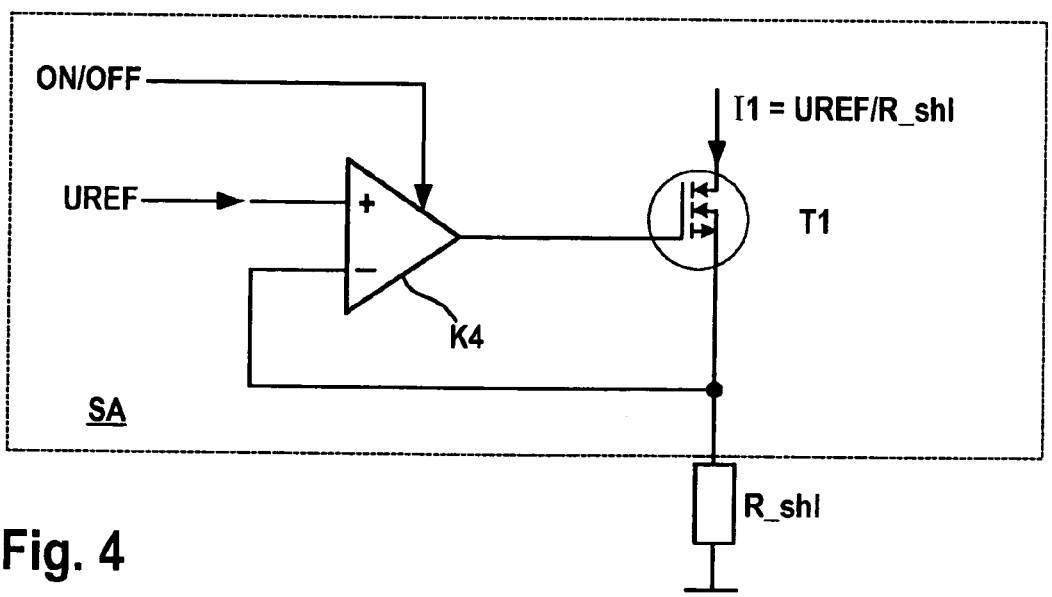
FIG. 4 shows a first example embodiment of a power source according to the present invention.

FIG. 4 shows a first example embodiment of the power sources according to the present invention which are used, for example, in the arrangement according to FIG. 2 for slope shaping. For this purpose, a current controller is provided which is designed as a constant power source. Reference voltage UREF is generated on system ASIC SA as a so-called band gap voltage. Furthermore, a proper shunt resistor R_SH1 is provided which has a small temperature coefficient. This shunt resistor R_SH is connected externally since these resistors cannot be manufactured accurately enough in ASICs using the normal mixed processes. Operation amplifier K4 regulates Transistor T1, which is designed as an N-channel MOSFET, in such a way that the voltage on R_SH1 is equal to the reference voltage so that a current IDIA=UREF/R_SH1 occurs. If the instantaneous reference voltage is formed by the output vector (decoder word), e.g., UREF=S0*UREF0+ S1*UREF1+S2*UREF2+3*UREF3 with (S0, S1, S2, S3)=binary decoder word (vector), UREF0, UREF1, UREF2, UREF3 parts of an ASIC-internally present band gap voltage Ubgap, a new diagnostic current IDIA may be predefined with each new decoder word. The used vector may also have more than 4 bits.

Figure 5:
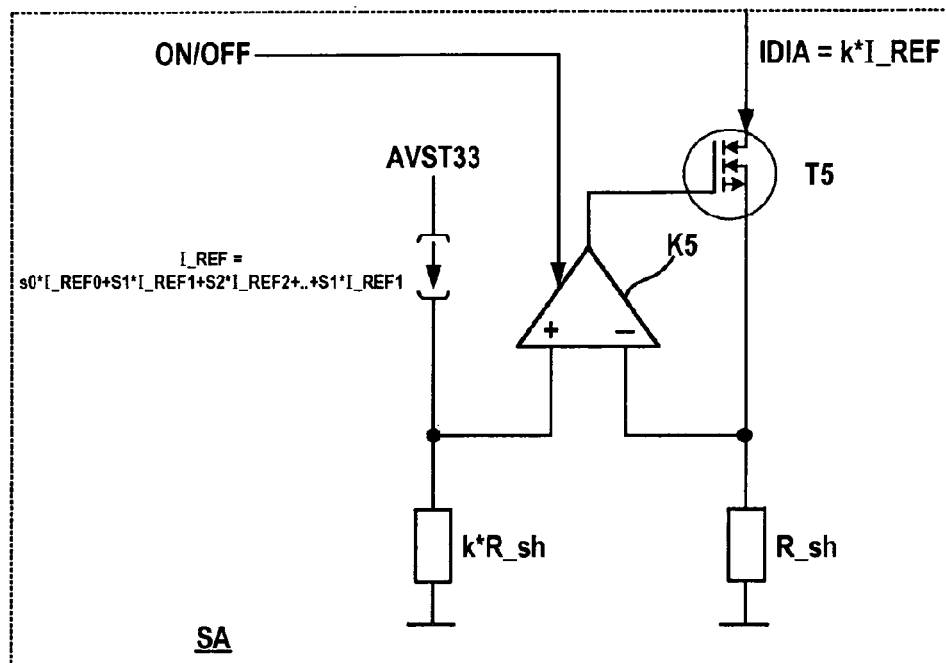
FIG. 5 shows a second example embodiment of a power source according to the present invention.

Another example embodiment is provided in FIG. 5, a constant power source again being generated on system ASIC SA. This variant initially requires a typical ASIC current bank (not depicted here) which is derived from a reference voltage UREF, which in turn is generated from the band gap, and an external precise resistor. This makes it possible to generate high-side base currents IREF0, IREF1, IREF2 through IREFL which are decoupled from the current bank using known current mirror techniques. Using an activating vector S0, S1, S2 . . . SL a total current I_REF=S0*I_REF0+ S1*I_REF1+ . . . may be formed. This is symbolized by power source IREF.

By using two adapted resistors R_SH and the multiple K*R_SH, an accurate and temperature-stable current IDIA=K*I_REF may be generated, since although the resistors are inaccurate they have the almost constant factor K relative to one another. This is the geometrical size factor. This factor may be accurately adjusted in ASICs since it is associated with the very good masking precision in semiconductor processes. The temperature coefficient is also good since the material properties of the same resistor types do not differ. The described embodiment may be particularly advantageously used in ASICs having a central reference current for generating transmitter current IDIA since no additional external components or pins are necessary. Operation amplifier K5 correspondingly controls transistor T5. Only a large output transistor T5 is necessary since the weight of the sum of the reference currents is selected for the generally described source IREF using the activating vector of the decoder. This results in a most favorable approach since only small reference power sources are present and the output current of the diagnostic driver is formed by shunt resistor ratio K.

Another embodiment is provided by classic power sources as sinks, the current vector of the decoder establishing which current sink is switched, as provided in FIG. 2. This classic option avoids the disadvantages of the first embodiment according to FIG. 4, i.e., the use of a LIN-specific external shunt pin, but it cannot sparingly deal with the surface of the LIN driver. Also based on the central current bank, each source current IREF1 may be generated from the current bank using current mirrors having corresponding mirror ratios. Since these sources are directly used for forming current IDIA and, as in the second specific embodiment, the current reduced by factor K is not used, the surface requirement is larger than in the second embodiment for the same accuracy.

Figure 6:
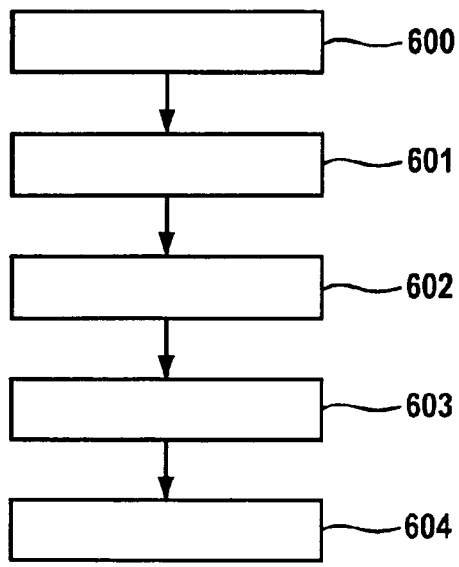
FIG. 6 shows a flow chart of the method according to the present invention.

FIG. 6 shows a flow chart of the method according to the present invention. In method step 600 it is recognized that a signal is to be transmitted, namely signal TXD. It is transmitted in method step 601 which type of edge is present, i.e., a rising or a falling edge. Due to the recognition, the counter is started in method step 602 and decoder 603 will establish current vectors as a function of the counter content for properly switching the power sources. The edges are then properly formed in method step 604.

What is claimed is:

1. A control unit for activating a passenger protection arrangement, comprising:
    at least one interface configured to output a digital data signal, wherein the at least one interface has a plurality of power sources for influencing signal edges of the digital data signal; and
    a microcontroller configured to control the activation of the passenger protection arrangement based on the digital data signal;
    wherein the control unit configures the signal edges by switching the power sources to shape slopes of the signal edges, so as to provide an optimum electromagnetic compatibility (EMC).

2. The control unit as recited in claim 1, wherein the power sources are digitally switched at a predefined point in time to influence the signal edges, a first clock rate for the switching of the power sources being greater than data clock rate.

3. The control unit as recited in claim 2, wherein the interface includes:
    a recognition circuit configured to recognize edges of the digital data signal;
    a counter configured to start counting as a function of a recognition signal generated by the recognition circuit, the recognition signal being generated in response to recognition of a signal edge; and
    a decoder configured to control the switching of the power sources as a function of the counter content.

4. The control unit as recited in claim 2, wherein the interface has four power sources.

5. The control unit as recited in claim 2, wherein the first clock rate is at least 100 times greater than the data clock rate.

6. The control unit as recited in claim 2, wherein the interface further includes an influencing circuit configured to influence current values of selected power sources.

7. The control unit as recited in claim 6, wherein the interface is situated on an integrated circuit having additional control unit functions.

8. A vehicle sensor system, comprising:
    a sensor for outputting a crash-relevant signal;
    an interface connected to the sensor for outputting a digital data signal based on the crash-relevant signal, wherein the interface has a plurality of power sources for influencing signal edges of the digital data signal; and
    a control unit that configures the signal edges by switching the power sources to shape slopes of the signal edges, so as to provide an optimum electromagnetic compatibility (EMC).

9. A method for activating a passenger protection arrangement of a vehicle, the method comprising:

receiving from a vehicle sensor at least one crash-relevant signal;

generating, from an interface, a digital data signal based on the crash-relevant signal, wherein signal edges of the digital data signal are influenced with the aid of a plurality of power sources in the interface;

switching the power sources to shape slopes of the signal edges, so as to provide an optimum electromagnetic compatibility (EMC); and controlling, using a microcontroller, the activation of the passenger protection arrangement based on the digital data signal.

10. The method as recited in claim 9, wherein the power sources are digitally switched to influence the signal edges at predefined points in time, a first clock rate for the switching of the power sources being greater than data clock rate.

11. A control unit for activating a passenger protection arrangement, comprising:

at least one interface configured to output a digital data signal, wherein the at least one interface has a plurality of power sources for influencing signal edges of the digital data signal; and a microcontroller configured to control the activation of the passenger protection arrangement based on the digital data signal;

wherein the signal edges are configured so as to provide an optimum electromagnetic compatibility (EMC), and wherein the power sources are digitally switched at a predefined point in time to influence the signal edges, a first clock rate for the switching of the power sources being greater than data clock rate, wherein the interface includes a recognition circuit configured to recognize the output of the digital data signal, a counter configured to start counting as a function of a recognition signal generated by the recognition circuit, and a decoder configured to control the switching of the power sources as a function of the counter content, and wherein the interface includes an influencing circuit configured to influence current values of selected power sources.

12. The control unit as recited in claim 2, wherein the interface has four power sources, and wherein the first clock rate is at least 100 times greater than the data clock rate.

13. The control unit as recited in claim 12, wherein the interface is situated on an integrated circuit having additional control unit functions.

14. The control unit as recited in claim 11, wherein the interface is situated on an integrated circuit having additional control unit functions.

15. The control unit as recited in claim 2, wherein the control unit shapes the slopes of the signal edges so as to improve symmetry between rising and falling edges.

16. The control unit as recited in claim 2, wherein the power sources contribute to a total current that is superimposed on the digital data signal.

17. The control unit as recited in claim 2, wherein the control unit shapes the slopes of the signal edges so as to improve symmetry between rising and falling edges, and wherein the power sources contribute to a total current that is superimposed on the digital data signal.

18. The control unit as recited in claim 3, wherein the counter stops counting after reaching a value associated with a stop decoder word, at which point the decoder controls the power sources to maintain a currently existing switched state of the power sources until a next edge transition.

* * * * *